United States Patent
Caroli

(10) Patent No.: US 7,371,297 B2
(45) Date of Patent: May 13, 2008

(54) ULTRASOUND UNIT FOR SEALING LENGTHS OF FILTER PAPER

(75) Inventor: Rodolfo Caroli, Imola (IT)

(73) Assignee: I.M.A. Industria Macchine Automatiche S.p.A., Bologna (IT)

( * ) Notice: Subject to any disclaimer, the term of this patent is extended or adjusted under 35 U.S.C. 154(b) by 267 days.

(21) Appl. No.: 10/546,195

(22) PCT Filed: Jul. 15, 2004

(86) PCT No.: PCT/IB2004/002323

§ 371 (c)(1),
(2), (4) Date: Aug. 18, 2005

(87) PCT Pub. No.: WO2005/007395

PCT Pub. Date: Jan. 27, 2005

(65) Prior Publication Data

US 2006/0254721 A1 Nov. 16, 2006

(30) Foreign Application Priority Data

Jul. 21, 2003 (EP) .................................. 03425487

(51) Int. Cl.
*B32B 37/00* (2006.01)
(52) U.S. Cl. ........................ 156/64; 156/73.1; 53/134.2
(58) Field of Classification Search .................. 156/64, 156/73.1, 290, 292, 308.2, 308.4, 358, 580.1, 156/580.2; 53/DIG. 2, 128.1, 133.5, 134.1, 53/134.2, 136.1, 285, 393
See application file for complete search history.

(56) References Cited

U.S. PATENT DOCUMENTS

| 4,631,685 A | 12/1986 | Peter |
| 5,934,043 A | 8/1999 | Aindow et al. |
| 6,592,711 B1 | 7/2003 | Kubik |
| 2002/0005027 A1 | 1/2002 | Lohrey et al. |

FOREIGN PATENT DOCUMENTS

| DE | 195 36 881 A1 | 6/1997 |
| JP | 2004-123150 | 4/2004 |

*Primary Examiner*—James Sells
(74) *Attorney, Agent, or Firm*—Arent Fox LLP

(57) ABSTRACT

A unit for sealing filter bags for products for infusion comprises at least: a shaped revolving roller (2) with circumferential and radial tracks (3, 4) that act as guides to make longitudinal and transversal contact seals on a web (5) of filter paper folded onto itself and moving under the roller (2), using sealing sonotrode means (6) arranged in sealing position under the roller (2) and close to the moving web (5) in such a way as to form) a tubular web of filter paper with a succession of substantially flattened filter bags formed on it; the sealing sonotrode means (6) being operated upon by fluid-driven means (7) designed to control, through appropriate means (8), the variable constituted) by the contact force and/or the distance between the sealing means (6) and the roller (2).

3 Claims, 3 Drawing Sheets

ULTRASOUND UNIT FOR SEALING LENGTHS OF FILTER PAPER

CROSS-REFERENCE TO RELATED APPLICATION

This application is a National Stage entry of International Application Number PCT/IB2004/002323, filed Jul. 15, 2004. The disclosure of the prior application is hereby incorporated herein in its entirety by reference.

TECHNICAL FIELD

The present invention relates to an ultrasound unit for sealing lengths of filter paper.

We refer in particular to the sealing process performed in machines for making filter bags or sachets containing a product for infusion such as tea, camomile and the like.

BACKGROUND ART

Prior art machines for making filter bags from a web of filter paper comprise a plurality of stations, including a station for feeding a web of filter paper, a folding station and a first station for longitudinally sealing the folded web to form a continuous tubular wrapping of filter paper and preferably for transversally sealing the continuous tubular wrapping to form a succession of filter bags of substantially flattened shape.

The longitudinal and transversal sealing station comprises a specially shaped upper roller with tracks for longitudinally and transversally sealing the continuous tubular wrapping of filter paper. The seals may be made by heat sealing means or, in the solutions of the latest generation, by sonotrodes, positioned in contact with the product to be sealed.

In practice, the sonotrode is the transducer element that converts the power supply into vibrations that are discharged onto the product to be sealed.

Current sealing units based on sonotrodes usually comprise a pair of sonotrodes placed side by side to enable both seals to be made. The sonotrodes are positioned so that they face the roller and are mounted on a rigid structure so as to keep the gap between each sonotrode and the filter paper as constant as possible.

Indeed, the Applicant has found that the relative position between the emitting surface of the sonotrode and the product supporting surface constitutes a fundamental variable for good sealing quality.

Current sealing units based on sonotrodes, however, involve highly rigid systems of supports with a multiplicity of sensors and devices for controlling the force applied to the sonotrodes which make it extremely difficult to keep this relative position firm and constant.

Indeed, the system is unsuitable for very thin materials such as filter paper since the rigidity of the supports and the high number of external control variables for maintaining the distance between the sontrode and the product create vibrations resulting in distances that are larger than acceptable for a good quality seal and slowing down sealing operations themselves on account of control and feedback between the sonotrodes and the control system.

The present invention therefore has for an object to overcome the above mentioned drawback through a unit that enables the sealer sonotrode to apply a substantially constant contact force on the product to be sealed, while at the same time allowing high operating speeds and reducing costs.

DISCLOSURE OF THE INVENTION

According to the invention, this object is achieved by a unit for sealing filter bags for products for infusion comprising at least: a shaped revolving roller with circumferential and radial tracks that act as guides to make longitudinal and transversal contact seals on a web of filter paper folded onto itself and moving under the roller using sealing sonotrode means arranged in sealing position under the roller and close to the moving web in such a way as to form a tubular web of filter paper with a succession of substantially flattened filter bags formed on it; the sealing sonotrode means being operated upon by fluid-driven means designed to control, through appropriate means, the variable constituted by the contact force and/or the distance between the sealing means and the roller.

DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which:

DETAILED DESCRIPTION OF THE PREFERRED EMBODIMENTS OF THE INVENTION

Figure 1:
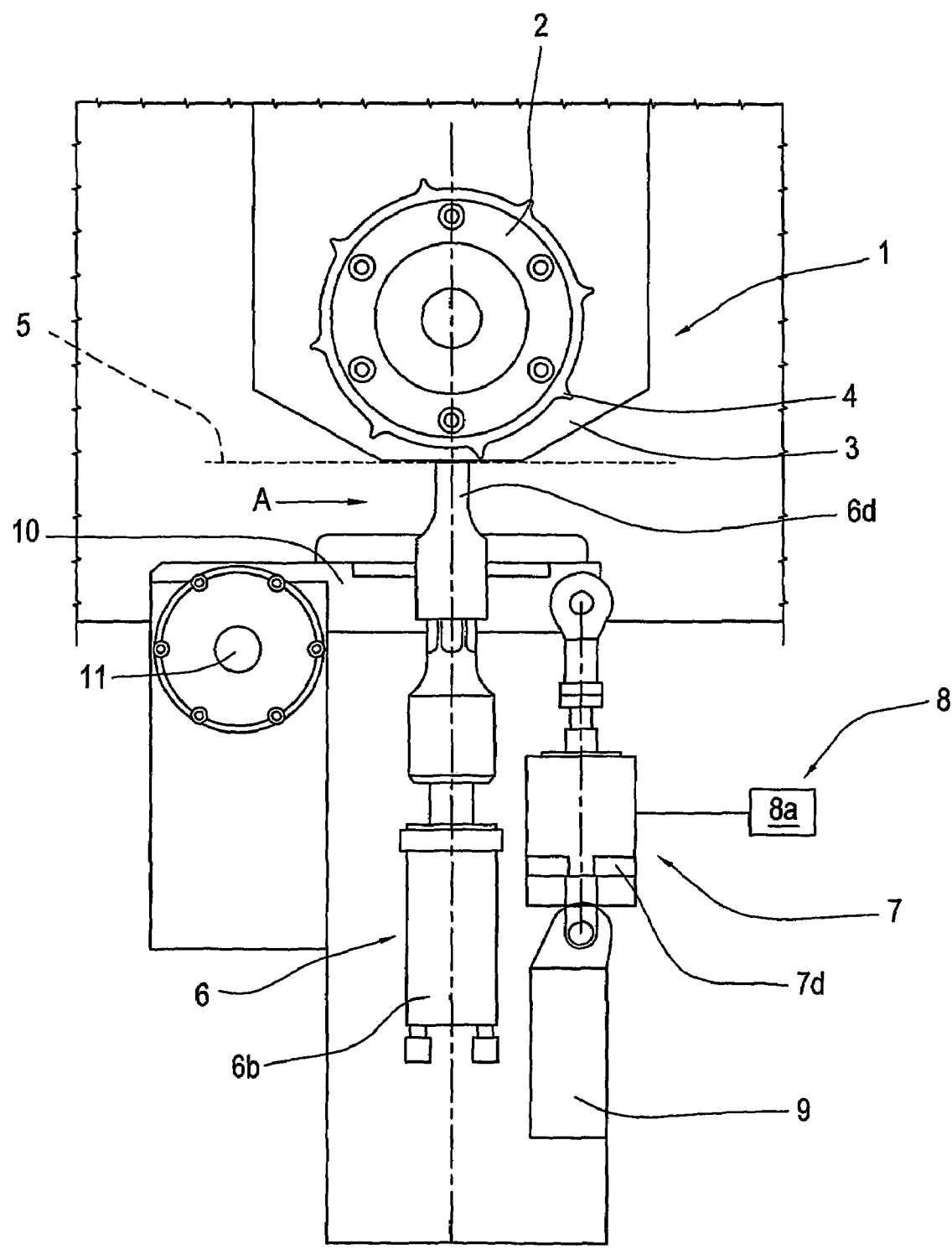
FIG. 1 is a front view, with some parts cut away and others in cross section, of an ultrasound unit for sealing lengths of filter paper according to the invention.

With reference to the accompanying drawings, in particular FIG. 1, the unit according to the invention is used to seal filter bags for products for infusion.

More specifically, the unit, which is denoted in its entirety by the numeral 1, may be used to make longitudinal and transversal seals on a web of filter paper 5 (drawn with a dashed line) unwound from a roll of filter paper and folded onto itself at a suitable station (neither of these being illustrated in the accompanying drawings).

The unit 1 essentially comprises:

a shaped revolving roller 2 with circumferential and radial tracks 3 and 4 that act as guides to make a longitudinal and transversal contact seal on a web 5 of filter paper folded onto itself and moving under the roller 2 (see arrow A), using sealing sonotrode means 6 arranged in sealing position under the roller 2 and close to the moving web 5 in such a way as to form a tubular web of filter paper with a succession of substantially flattened filter bags formed on it.

Still with reference to FIG. 1, the sealing sonotrode means 6 are operated upon by fluid-driven means 7 designed to control, through appropriate means 8, the variable constituted by the contact force and/or the distance between the sealing means 6 and the roller 2.

More specifically, the fluid-driven means 7 may consist of at least one pneumatic cylinder 7c linked at one end to a fixed lower frame 9 (forming part of the machine) and at the other end to the upper portion of the sealing sonotrode means 6.

Figure 2:
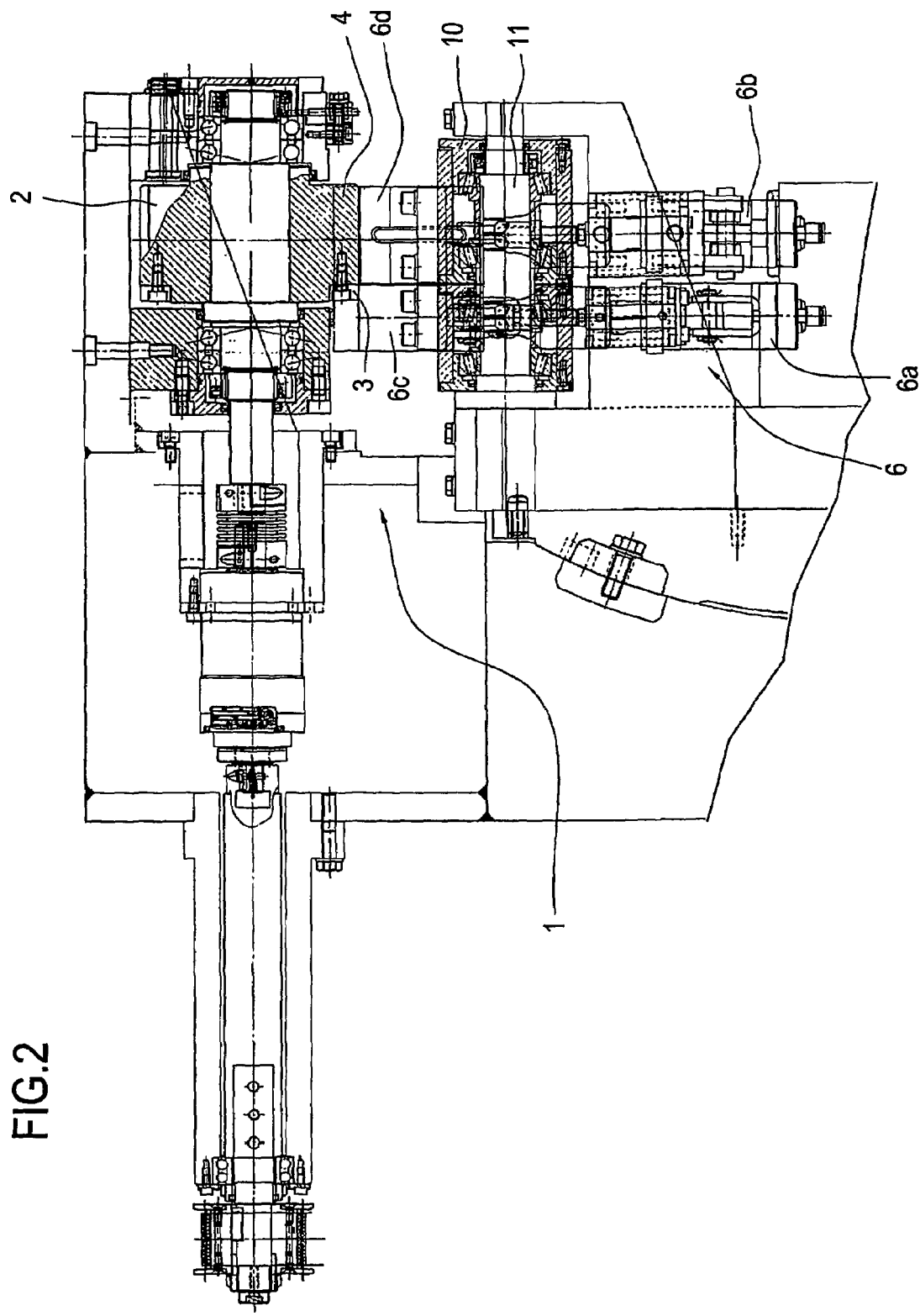
FIG. 2 is a side view, with some parts cut away and other parts in cross-section, of the unit of FIG. 1.
Figure 3:
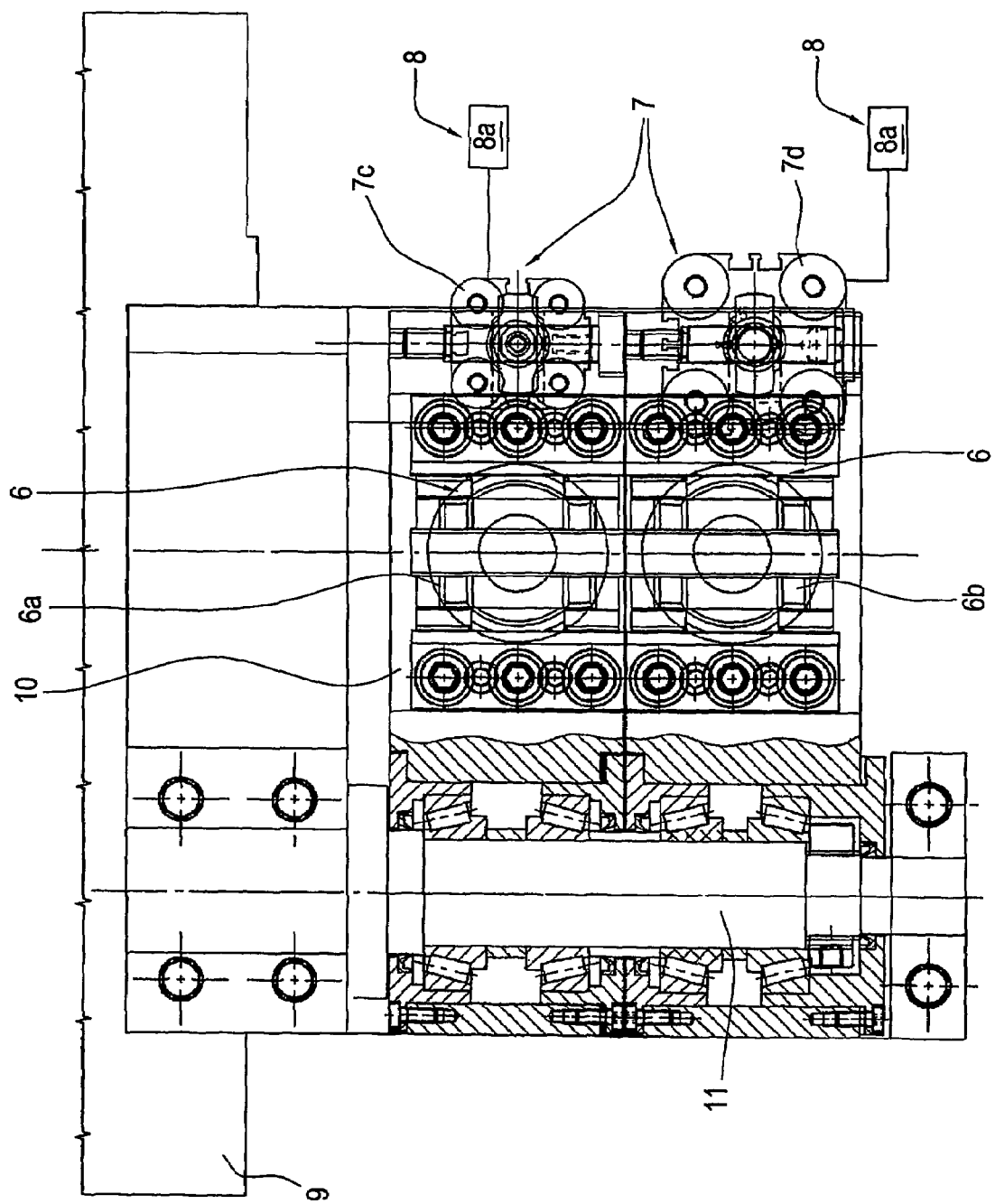
FIG. 3 is a schematic top plan view, with some parts cut away and other parts in cross-section, of the unit of FIG. 1.

As illustrated in FIGS. 2 and 3, the sealing sonotrode means 6 are two separate sonotrode units 6a and 6b mounted side by side in such a way as to perform two separate sealing operations, resulting in a longitudinal seal (made by the unit 6a) and a transversal seal (made by the unit 6b), acting in conjunction with respective plates 6c, 6d that come into contact with the passing product and with the aforementioned tracks 3 and 4.

The first sonotrode 6a is in constant contact with the web 5 against a circumferential track 3 on the roller 2, whilst the second sonotrode 6b is spaced from the web 5 and makes a transversal each time one of the radial tracks 4 passes.

The sonotrode units 6a and 6b are supported by a plate 10 that is linked to a shaft 11 protruding from the fixed frame 9. The fluid-driven means 7 preferably comprise two cylinders 7c and 7d linked at the top to the plate 10 in such a way that the first cylinder 7c permits adjustment of the contact force on the first sonotrode 6a that makes the longitudinal seal on the web 5, and the second cylinder 7d permits adjustment of the gap between the working end of the other sonotrode 6b and the respective transversal sealing track 4 facing the sonotrode 6b.

The aforementioned means 8 for controlling the cylinders 7c and 7d may consist of a respective pressure switch 8a designed to vary the contact force and/or the distance of the sonotrode units 6a, 6b.

It will be understood that the invention can be modified and adapted in several ways without thereby departing from the scope of the inventive concept. Moreover, all the details of the invention may be substituted by technically equivalent elements.

The invention claimed is:

1. A unit for sealing filter bags for products for infusion, comprising:

a shaped revolving roller with circumferential and radial tracks that act as guides to make longitudinal and transversal contact seals on a web of filter paper folded onto itself and moving under the roller;

two sonotrode units mounted side by side on a plate linked to a shaft protruding from a fixed frame; said two sonotrode units being arranged in sealing position under the roller and close to the moving web; said first sonotrode making longitudinal seal on the web and said second sonotrode making transversal seal on the web for forming a tubular web of filter paper with a succession of substantially flattened filter bags;

two pneumatic cylinders linked at the top to the plate and to said sonotrode units in such a way that the first pneumatic cylinder permits adjustment of the contact force of the first sonotrode on the web, and the second pneumatic cylinder permits adjustment of the gap between the working end of the second sonotrode and a transversal sealing track on the web.

2. The unit according to claim 1 wherein said pneumatic cylinders are linked at one end to said fixed frame and at the other end to the upper portion of the sonotrode units.

3. The unit according to claim 1, comprising means for controlling the two pneumatic cylinders; said means consisting of a pressure switch.

\* \* \* \* \*